(12) United States Patent
Kewitsch et al.

(10) Patent No.: US 6,236,782 B1
(45) Date of Patent: May 22, 2001

(54) GRATING ASSISTED COUPLER DEVICES

(75) Inventors: Anthony S. Kewitsch, Hacienda Heights; George A. Rakuljic, Santa Monica; Phil A. Willems; Xiaolin Tong, both of Pasadena, all of CA (US)

(73) Assignee: Arroyo Optics, Inc., Santa Monica, CA (US)

( * ) Notice: Subject to any disclaimer, the term of this patent is extended or adjusted under 35 U.S.C. 154(b) by 0 days.

(21) Appl. No.: 09/128,477

(22) Filed: Aug. 4, 1998

Related U.S. Application Data

(63) Continuation-in-part of application No. 08/738,068, filed on Oct. 25, 1996, now Pat. No. 5,875,272, which is a continuation-in-part of application No. 08/703,357, filed on Aug. 26, 1996, now Pat. No. 5,805,751.
(60) Provisional application No. 60/005,915, filed on Oct. 27, 1995, and provisional application No. 60/002,916, filed on Aug. 29, 1995.

(51) Int. Cl.$^7$ ........................................ G02B 6/26
(52) U.S. Cl. ................ 385/43; 385/37; 385/46; 385/48; 385/96
(58) Field of Search ................ 385/43, 37, 42, 385/46, 48, 50, 96, 10

(56) References Cited

U.S. PATENT DOCUMENTS

| | | | |
|---|---|---|---|
| 4,465,336 | * 8/1984 | Huber et al. | 350/96.3 |
| 4,474,427 | 10/1984 | Hill et al. | 385/123 |
| 4,725,110 | 2/1988 | Glenn et al. | 385/100 |
| 4,737,007 | 4/1988 | Alferness et al. | 385/37 |
| 4,750,802 | * 6/1988 | Bhagavatula | 350/96.15 |
| 4,807,950 | 2/1989 | Glenn et al. | 385/123 |
| 4,900,119 | 2/1990 | Hill et al. | 385/27 |

(List continued on next page.)

FOREIGN PATENT DOCUMENTS

| | | |
|---|---|---|
| WO89/12243 | 12/1989 | (WO) . |
| WO95/14946 | 6/1995 | (WO) . |

OTHER PUBLICATIONS

M.S. Yataki, et al., "All–Fibre Wavelength Filters Using Concatenated Fused–Tapered Couplers", Elect. Ltrs., vol. 21, No.6, Mar. 1985, pp. 248–249.

M.C. Farries, et al., "Very Broad Reflection Bandwidth (44nm) Chirped Fibre Gratings & Narrow Bandpass Filters Produced by the Use of an Amplitude Mask", Elect. Ltrs., vol. 30, No. 11, May 1994.

(List continued on next page.)

*Primary Examiner*—Hung N. Ngo
(74) *Attorney, Agent, or Firm*—Jones, Tullar & Cooper, P.C.

(57) ABSTRACT

An add/drop filter for optical wave energy incorporates a Bragg grating in a very narrow waist region defined by merged lengths of elongated optical fibers. Light is propagated into the waist region via adiabatically tapered fibers and is transformed from two longitudinally adjacent fibers into two orthogonal modes within the air-glass waveguide of the waist and reflected off the grating from one fiber into the other. The geometry of the waist region is such that the reflected drop wavelength is polarization independent, without lossy peaks in the wavelength band of interest. Additionally, back reflection are shifted out of the wavelength band of interest. High strength gratings are written by photosensitizing the waist region fibers by constantly in-diffusing pressurized hydrogen or deuterium. For narrow spectral bandwidth gratings, dimensional variations must be minimized or compensated, and the grating is apodized by both a.c. and d.c. variations in writing beams at a net constant power. A coupler device employing these precisely is arranged in a support structure which facilitates writing, testing and adjustment of gratings, and also provides temperature compensation and wavelength adjustment.

76 Claims, 5 Drawing Sheets

U.S. PATENT DOCUMENTS

| | | | |
|---|---|---|---|
| 5,007,705 | 4/1991 | Morey et al. | 385/12 |
| 5,016,967 | 5/1991 | Meltz et al. | 385/37 |
| 5,104,209 | 4/1992 | Hill et al. | 385/37 |
| 5,157,747 | 10/1992 | Atkins et al. | 385/123 |
| 5,187,760 | 2/1993 | Huber | 385/37 |
| 5,216,739 | 6/1993 | Hill et al. | 385/123 |
| 5,218,655 | 6/1993 | Mizrahi | 385/37 |
| 5,235,659 | 8/1993 | Atkins et al. | 385/124 |
| 5,271,024 | 12/1993 | Huber | 385/37 |
| 5,283,686 | 2/1994 | Huber | 385/37 |
| 5,287,427 | 2/1994 | Atkins et al. | 385/124 |
| 5,309,260 | 5/1994 | Mizrahi et al. | 385/37 |
| 5,327,515 | 7/1994 | Anderson et al. | 385/123 |
| 5,337,382 | 8/1994 | Mizrahi | 385/37 |
| 5,351,321 | 9/1994 | Snitzer et al. | 385/37 |
| 5,363,239 | 11/1994 | Mizrahi et al. | 385/10 |
| 5,367,588 | 11/1994 | Hill et al. | 385/37 |
| 5,377,288 | 12/1994 | Kashyap et al. | 385/37 |
| 5,400,166 | 3/1995 | Huber | 359/173 |
| 5,416,866 | 5/1995 | Sehlen | 385/37 |
| 5,420,948 | 5/1995 | Byron | 385/37 |
| 5,425,116 | 6/1995 | Dragone et al. | 385/37 |
| 5,444,803 | 8/1995 | Kim et al. | 385/37 |
| 5,450,511 | 9/1995 | Dragone et al. | 385/37 |
| 5,457,758 | 10/1995 | Snitzer | 385/25 |
| 5,459,801 | 10/1995 | Snitzer | 385/30 |
| 5,495,543 * | 2/1996 | Alferness et al. | 385/37 |
| 5,495,548 | 2/1996 | Bilodeau et al. | 385/123 |
| 5,506,925 | 4/1996 | Greene et al. | 385/129 |
| 5,517,589 | 5/1996 | Takeuchi | 385/37 |
| 5,574,807 | 11/1996 | Snitzer | 385/24 |
| 5,581,642 | 12/1996 | Deacon et al. | 385/15 |
| 5,627,933 | 5/1997 | Ito et al. | 385/123 |
| 5,633,965 | 5/1997 | Bricheno et al. | 385/37 |
| 5,764,831 * | 6/1998 | Lauzon | 385/43 |
| 5,790,726 | 8/1998 | Ito et al. | 385/37 |
| 5,937,115 * | 8/1999 | Domash | 385/16 |

OTHER PUBLICATIONS

Victor Mizrahi, et al., "Optical Properties of Photosensitive Fiber Phase Gratings", J. Of Lightwave Tech., vol. 11, No. 11, Oct. 93, pp. 1513–1517.

R.M. Atkins, et al., "Mechanisms of Enhanced UV Photosensitivity Via Hydrogen Loading in Germanosilicate Glasses", IEE 1993, May 11, 1993.

B. Malo et al., "Point–by–Point Fabrication of Micro–Bragg Gratings in Photosensitive Fibre Using Single Excimer Pulse Refractive Index Modification Techniques", Elect. Ltrs., vol. 29, No. 18, Sep. 2, 1993, pp. 1668–1669.

Francois Ouellete, et al., "Enhancement of Second–Harmonic Generation in Optical Fibers by A Hydrogen & Heat Treatment", Appl. Phys. Lett. 54(12), Mar. 20, 1989, pp. 1086–1088.

P.J. Lemaire, et al., "High Pressure H2 Loading as A Technique for Achieving Ultrahigh UV Photosensitivity & Thermal Sensitivity in GeO2 Doped Optical Fibers", IEE 1993, Apr. 23, 1993, pp. 1191–1193.

K.O. Hill, et al., "Photosensitivity in Optical Fibers", Ann Rev. Mater Sci. 1993, 125–157.

T.A. Birks, et al., "2x2 Single–Mode Fiber Routing Switch", Optics Ltrs., vol. 21, No. 10, May 1996, pp. 722–724.

T.A. Birks, et al., "Low Power Acousto–Optic Device Based on a Tapered Single–Mode Fiber", IEEE Photon. Tech. Ltrs., vol. 6, No. 6, Jun. 1994, pp. 725–727.

D.O. Culverhouse et al., "Four Port Fused Taper Acousto–Optic Devices Using Standard Singlemode Telecommunciations Fibre", Elect. Ltrs., vol. 31, No. 15 Jul. 1995, pp. 1279–1280.

T.A. Birks, et al., "Four–Port Fiber Frequency Shifter With a Null Taper Coupler", Optics Ltrs., vol. 19, No. 23, Dec. 1994, pp. 1964–1966.

T.A. Birks, et al., "All–Fiber Polarizer Based on a Null Taper Coupler", Optics Ltrs., vol. 20, No. 12, Jun. 1995, pp. 1371–1373.

L. Dong, et al., "Single Pulse Bragg Gratings Written During Fibre Drawings", Elect. Ltrs., vol. 29, No. 17, Aug. 1993, pp. 1577–1578.

F. Bilodeau, et al., "Photosensitization of Optical Fiber & Silica–on–Silicon/Silica Waveguides", Optics Ltrs., vol. 18, No. 12, Jun. 1993, pp. 953–955.

Paul J. Lemaire, "Reliability of Optical Fibers Exposed to Hydrogen: Prediction of Long–Term Loss Increases", Optic Eng., vol. 30, No. 6, Jun. 1991, pp. 780–789.

Y, Inoue, et al., "Silica–Based Arrayed–Waveguide Grating Circuit as Optical Splitter/Router", IEEE, Mar. 1995.

J.L. Archambault et al., "Grating–frustrated coupler: a novel channel–dropping filter in single–mode optical fiber", Optics Letters, vol. 19, No. 3, Feb. 1, 1994, pp. 180–182.

F. Ouellette et al., "Permanent photoinduced birefringence in a Ge–doped fiber", Applied Physics Letters, vol. 58, No. 17, Apr. 29, 1991, pp. 1813–1815.

S.G. Farewell, "2x2 Fused Fiber Null Couplers with Asymmetric Waist Cross Sections for Polarization Independent (<0.01 dB) Switching", Journal of Lightwave Technology, vol. 16, No. 9, Sep. 1998, pp 1671–1679.

F. Bakhti et al., "Optical Add/Drop Multiplexer Based on UV–Written Bragg Grating in a Fused 100% Coupler", Elect. Ltrs., vol. 33, 1997, pp. 803–804.

T.A. Birks, "Twist–induced tuning in tapered fiber couplers", Applied Optics, vol. 28, No. 19, Oct. 1, 1989, pp. 4226–4233.

D.O. Culverhouse et al., "All Fiber 2x2 Polarization Insensitive Switch", IEEE Photo. Tech. Ltrs., vol. 9, No. 4, Apr. 1997, pp. 455–457.

D.O. Culverhouse et al., "3x3 All–Fiber Routing Switch", IEEE Photo. Tech. Ltrs., vol. 9, No. 3, Mar. 1997, pp. 333–335.

Seok Hyun Yun et al., "Suppression of polarization dependence in a two–mode fiber acousto–optic device", Optics Ltrs., vol. 21, No. 12, Jun. 15, 1996, pp. 908–910.

X. Steve Yao et al., "Simple in–line method to measure the dispersion of an optical system", Appl. Phys. Lett. 62 (8), Feb. 22, 1993, pp. 811–813.

E. Brinkmeyer et al., "Optical space domain reflectometry (OSDR) for determination of strength & chirp distribution along optical fiber gratings", BSuC2–133–35, Photosensitivity in Glass Meeting, Williamsburg, VA 1997.

S. Barcelos et al., "High accuracy dispersion measurements of chirped fibre gratings", Elect. Ltrs., wol. 31, No. 15, Jul. 20, 1995, pp. 1280–1282.

M.M. Ohn et al., "Arbitrary strain profile measurement within fibre gratings using interferometric Fourier transform technique", Elect. Ltrs., vol. 33, No. 14, Jul. 3, 1997, pp. 1242–1243.

M.A. Muriel et al., "Phase reconstruction from reflectivity in uniform fiber Bragg gratings", Optic Ltrs., vol. 22, No. 2, Jan. 15, 1997, pp. 93–95.

H. Kogelnik, "Filter Response of Nonuniform Almost–Periodic Structures", The Bell System Technical Journal, Jan. 1976, pp. 109–127.

M. Volanthen et al., "Measurement of arbitrary strain profiles within fibre gratings", Elect. Ltrs., vol. 32, No. 11, May 23, 1996, pp. 1028–1029.

M. LeBlanc et al., "Distributed strain measurement based on a fiber Bragg grating & its reflection spectrum analysis", Optic Ltrs., vol. 21, No. 17, Sep. 1, 1996, pp. 1405–1407.

R.C. Younquist et al., "Optical coherence–domain reflectometry: a new optical evaluation technique", Optics Ltrs., vol. 12, No. 3, Mar. 1987, pp. 158–160.

* cited by examiner

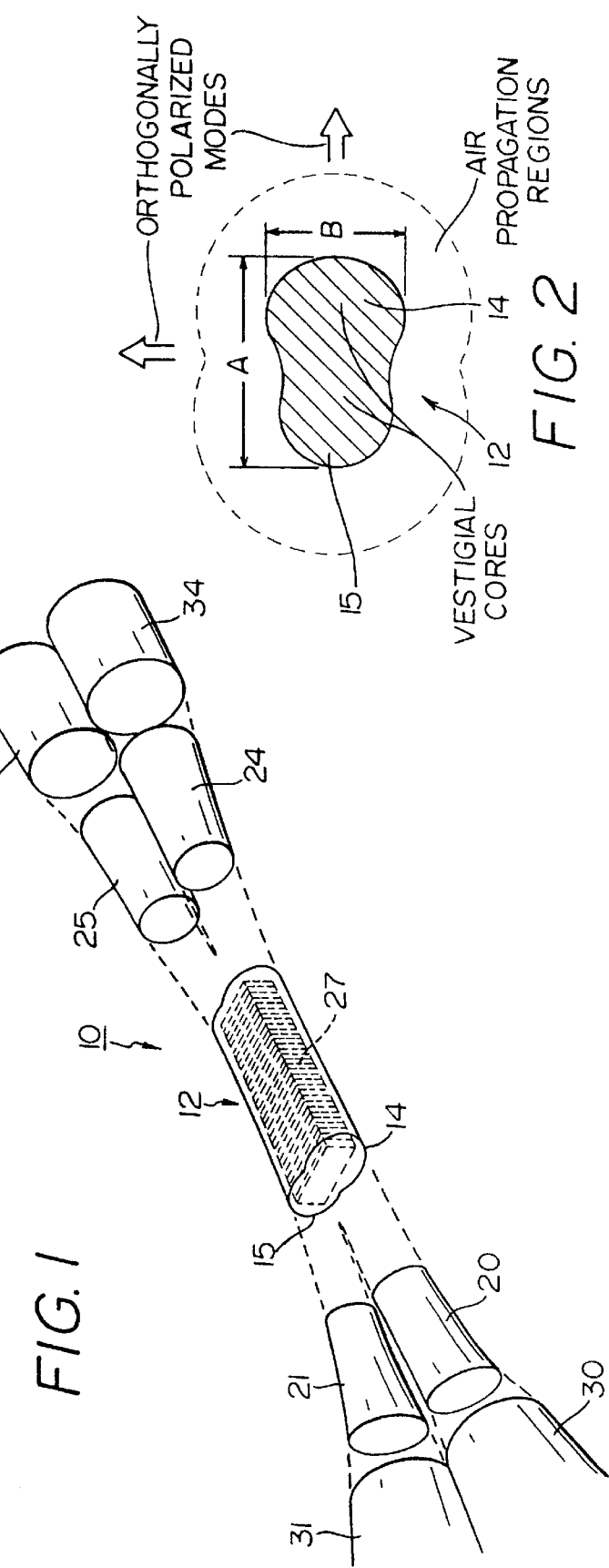
FIG. 1
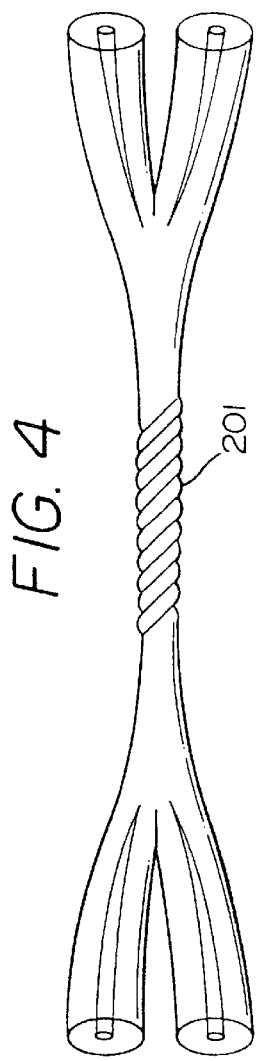
FIG. 2
FIG. 4

Normalized propagation constants for modes on a dielectric rod $\varepsilon_1=2.26$ in free space with ellipticity $b/a=0.90$: (a) odd modes, (b) even modes. (From [7].)

GRATING ASSISTED COUPLER DEVICES

The inventors rely for priority on prior applications entitled "Wavelength Selective Optical Couplers", filed Aug. 26, 1998, U.S. Ser. No. 08/03,357, now U.S. Pat. No. 5,805,751 "Wavelength Selective Optical Devices", filed Oct. 25, 1996, U.S. Ser. No. 08/738,068, now U.S. Pat. No. 5,875,272 on a U.S. provisional application Ser. No. 60/002,916, filed on Aug. 29, 1995 and on a U.S. provisional application, Ser. No. 60/015,915, filed Oct. 27, 1995. This application is a CIP of patent application Ser. No. 08/703,357 filed Aug. 26, 1996, U.S. Pat. No. 5,805,751, which is a CIP of patent application Ser. No. 08/738,068 filed Oct. 25, 1996, U.S. Pat. No. 5,875,272.

BACKGROUND OF THE INVENTION

This invention relates to optical wave propagation systems and devices utilizing electro-optical devices, and more particularly to grating assisted devices for filtering, coupling and other functions.

Communication systems now increasingly employ optical waveguides (optical fibers) which, because of their high speed, low attenuation and wide bandwidth characteristics, can be used for carrying data, video and voice signals concurrently. An important extension of these communication systems is the use of wavelength division multiplexing, by which a given wavelength band is segmented into separate wavelengths so that multiple traffic can be carried on a single installed line. This application requires the use of multiplexers and demultiplexers which are capable of dividing the band into given multiples (such as 4, 8, or 16 different wavelengths) which are separate but closely spaced. Adding individual wavelengths to a wideband signal, and extracting a given wavelength from a multi-wavelength signal require wavelength selective couplers, and this has led to the development of a number of add/drop filters, the common terminology now used for devices of this type.

Since wavelength selectivity is inherent in a Bragg grating, workers in the art have devised a number of grating-assisted devices for adding or extracting a given wavelength with respect to a multi-wavelength signal. Typical optical fibers propagate waves by the use of the light confining and guiding properties of a central core and a surrounding cladding of a lower index of refraction. The wave energy is principally propagated in the core, and a number of add/drop filters or couplers have been developed using Bragg gratings in the core region of one of a pair of parallel, closely adjacent or touching fibers. The coupling region is commonly termed "evanescent" in that a signal propagated along one fiber couples over into the other, as an inherent function of the design. The wavelength selectivity is established by the embedded grating which provides forward or backward transmission of the selected wavelength, depending upon chosen grating characteristics. For modern communication systems, however, this approach has a number of functional and operative limitations, pertaining to such factors as spectral selectivity, signal to noise ratio, grating strength, temperature instability and polarization sensitivity.

The applications referenced above are based upon a novel theoretical concept and practical implementation. A narrow waist region of two fused dissimilar fibers is defined between pairs of tapered coupling sections at each end. At the waist, the merged fibers are formed by elongation of an optical fiber precursor of generally conventional size and are so diametrically small that the central core effectively vanishes. The wave energy is transferred through the merged fiber region in two spatially overlapping, orthogonal modes. Since the propagating energize of the modes overlap, the coupling is potentially non-evanescent in the presence of a coupling mechanism such as a diffraction grating. For example, a reflective grating written in the waist region redirects only a selected wavelength of an input signal at the input port to the drop port, while all other wavelengths propagate through the waist section without reflection to the throughput port. This reflection grating couples light between two optical modes in a non-evanescent manner. Numerous advantages derive from this concept and configuration, but the realization of its full potential is dependent upon other developmental factors.

For example, modern applications require that any add/drop filter based upon this concept be very efficient at routing channels, have a strong grating which can be selectively and precisely placed at or adjusted to a specific wavelength and yet have a limited bandwidth, be temperature insensitive, compact, low cost, and not subject to spurious reflections or noise in the chosen wavelength band. Achieving high drop efficiency and low polarization dependence are particularly important. The problems of achieving these operative properties while at the same time providing a repeatably producible unit of very small size and high sensitivity have required much further innovation.

SUMMARY OF THE INVENTION

In accordance with the invention, the optical properties and performance of a grating assisted asymmetric fused coupler are highly dependent on the physical characteristics of the coupler waist. Polarization insensitivity of the drop wavelength can be achieved, for example, by controlling the shape during elongation or by applying a permanent twist to the coupler waist after the grating exposure. Furthermore, the small diameter waist renders the coupler sensitive to diameter non-uniformities but it is shown that these dimensional variations can be compensated by laser trimming or by impressing a compensated index of refraction grating. Further, the strength of the grating can be dramatically increased by in-diffusing a photosensitizing gas during the grating writing process. For improved spectral characteristics the grating is apodized and unchirped by being written with concurrent grating modulated (ac.) and uniform (d.c.) intensity UV beams. Size and other characteristics of the waist region are selected such that the drop wavelength of the coupler is adequately separated from the backreflection wavelength and the latter wavelength lies outside the frequency band of interest.

A small coupler having these properties and wavelength adjustability as well is enclosed within a prepackage structure which enables optical access to the coupler waist for grating writing. An elongated structure consisting of materials having different thermal coefficients of expansion is arranged to the temperature dependence of the drop wavelength. Moreover, the structure provides fine tuning so that the drop wavelength is precisely adjusted and subsequently maintained throughout the desired operating temperature range.

BRIEF DESCRIPTION OF THE DRAWINGS

A better understanding of the invention arises by reference to the following description, taken in conjunction with the accompanying drawings, in which:

FIG. 1 is a simplified and idealized view of the principal parts, namely the tapered coupling branches and the waist region, of a coupler in accordance with the invention, useful in describing the optical waveguide modes and characteristics;

FIG. 2 is an enlarged cross sectional view of the asymmetric waist section of the coupler of FIG. 1, with the extent of the optical wave energy propagating along the waveguide denoted by dotted lines;

FIG. 4 is a simplified and idealized view of a coupler twisted at the waist region to impart polarization independence;

DETAILED DESCRIPTION OF THE INVENTION

Figure 3A:
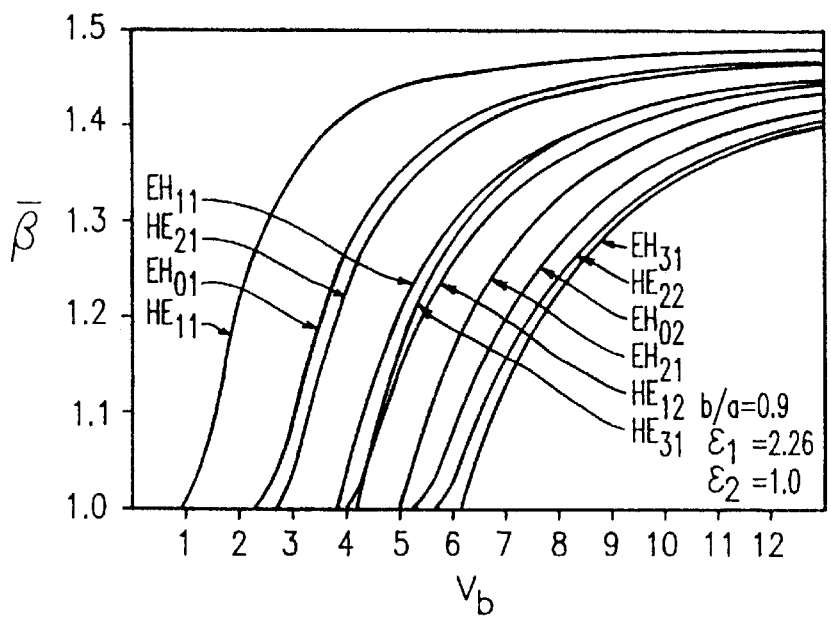
FIG. 3 is a pair of graphs (A) and (B) illustrating the relationship between normalized propagation constants and V number for waveguide configurations employed in these devices, useful in understanding how lossy cladding modes are eliminated, how an adequate separation between drop wavelength and back-reflection wavelength is achieved, and how diameter uniformity tolerances relate to coupler diameter.

An optical fiber wavelength router in accordance with the invention is exemplified by a wavelength selective filter, here of the type usually referred to as an add/drop filter. Such a device, in which multiple channels at different wavelengths are applied, redirects in a low loss, highly efficient manner the selected wavelength channels into a first optical fiber while transferring the remainder of the channels to a second optical fiber. While the concepts employed may be used for other applications, such as switches, multiple channel routers, and crossconnects, the add/drop filter is perhaps of greatest immediate benefit for multiplexers and demultiplexers in wavelength division multiplex (WDM) systems.

FIG. 1 illustrates the physical structure of this device. The fused coupler consists of a first fiber 31, 35 and a second fiber 30, 34 dissimilar in the vicinity of the coupling region 12 wherein an index of refraction grating 27 has been impressed. The two fibers may be made dissimilar by locally pretapering one of them by 20% in the vicinity of the fused region. Light launched into the single mode core of upper fiber 31 evolves adiabatically into an $LP_{11}$ mode with nominal propagation vector $\beta_1$ in the waist, and adiabatically evolves back into the single mode core of the output fiber 35. Light launched into the single mode core of the lower fiber 30 evolves adiabatically into the $LP_{01}$ mode with propagation vector $\beta_2$, and adiabatically evolves back into the single mode core of the output fiber 34. If an index of refraction grating 27 is impressed in the coupler waist 12, and if the wavelength is chosen such that $\beta_1$ and $\beta_2$ satisfy the Bragg law for reflection from an index grating of period $A_g$ at a particular wavelength, say $\lambda_i$:

$$|\beta_1(\lambda_i)| + |\beta_2(\lambda_i)| = \frac{2\pi}{\Lambda_g},$$

then the optical energy at $\lambda_i$ in the single mode core of the first fiber 31 is reflected non-evanescently by the grating into the single mode core of the second fiber 30. The spectral response and efficiency of this reflective and mode-converting coupling process is dictated by the non-evanescent coupling strength of the optical modes with the grating. If the wavelength of the input mode is detuned, say to $\lambda_j$, so that:

$$|\beta_1(\lambda_j)| + |\beta_2(\lambda_j)| \neq \frac{2\pi}{\Lambda_g}$$

then the Bragg law is no longer satisfied and the input mode in the first fiber 31 travels through the coupler waist 12 and reappears as the output mode of the first fiber 35, with minimal leakage into the second fiber 34. For these wavelengths the coupler is transparent; that is, no coupling occurs, and the two fused fibers remain optically independent. Therefore, only a particular wavelength $\lambda_i$ is coupled out of the first fiber 31, 35 as determined by the grating period in the coupling region 12.

Figure 3B:
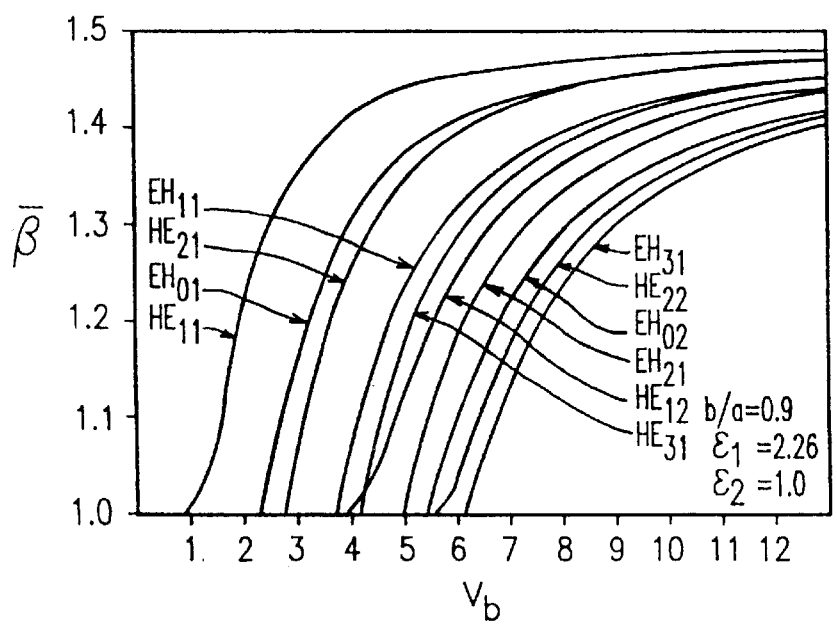

In addition to backwards coupling of light into the adjacent fiber, the grating typically reflects some light back into the original fibers at different wavelengths given by $2|\beta_1(\lambda_2)|=k_g$ and $2|\beta_2(\lambda_3)|=k_g$. To ensure that $\lambda_2$ and $\lambda_3$ are outside the wavelength operating range of interest, the difference between $\beta_1$ and $\beta_2$ is made sufficiently large. The difference increases as the waveguides become more strongly merged or as the fused coupler waist decreases in dimension. This general trend is depicted in FIG. 3, whereby the vertical axis separation between adjacent characteristic curves for eigenmodes of waveguide generally increases for smaller diameters (smaller V's). This difference is maximized for small coupler waists, where $\beta_1 i$ and $\beta_2$ correspond substantially to the $LP_{01}$ and $LP_{11}$ modes of an air-glass optical waveguide. The $LP_{01}$ mode is a common representation of the $HE_{11}^e$, $HE_{11}^o$ modes, and the $LP_{11}$ mode is a common representation of the $HE_{21}^e$, $HE_{21}^o$, $EH_{01}^e$, and $EH_{01}^o$ modes, illustrated in FIG. 3. It is common in the art to speak in terms of these LP modes in waveguide structures such as coupler waists that do not exhibit circular symmetry.

Furthermore, the tilt angle of the transversely asymmetric grating can be selected to reduce the coupling strength for backreflection of the $LP_{01}$ into $LP_{01}$ modes and the $LP_{11}$ into $LP_{11}$ modes. The other consideration in selecting angle is to maximize the mode conversion efficiency of the $LP_{10}$ into $LP_{11}$ and $LP_{11}$ into $LP_{01}$ modes. The typical angles to minimize backreflection coupling are in the range of 3 to 5 degrees and the angle increases as the coupler waist diameter decreases. This angle is slightly different than the angle to maximize the drop efficiency.

To form this fiber optic coupler, two locally dissimilar fibers are fused to a narrow waist typically 1 to 50 microns in diameter, forming a waveguide in the fused region which supports at least two supermodes or eigenmodes of the composite waveguide. The number of supermodes supported by this composite waveguide structure is determined by the index profile and dimensions of the structure. When this waveguide structure is significantly reduced in diameter, the waveguiding characteristics resemble that of an air-glass waveguide. The mode propagation behavior of this simplified step index waveguide is then partially described by a parameter defined as the V number, which decreases as the radius a of the waveguide core is decreased, and depends on the optical wavelength $\lambda_o$ of the mode, the core index $n_{core}$ and the cladding index $n_{clad}$:

$$V = \frac{2\pi a}{\lambda_o} \sqrt{n_{core}^2 - n_{clad}^2}.$$

For an air-glass waveguide $n_{core}$=1.45 and $n_{clad}$=1.0. For an elliptical cross section waveguide, the first or lowest order mode is nominally $LP_{01}$ and the second mode is nominally $LP_{11}$. Typically, higher order modes exist within the coupler waist, as the total number of modes supported by such a waveguide is $N \approx V^2/2$, which is 8–9 for a 4 micron diameter waist at 1550 nm. However, the two lowest order modes are principally important in the add/drop operation. In general, a lossy peak appears for each higher order mode greater than two. Because the two waveguides are sufficiently dissimilar and the tapered transition region is sufficiently long, the input optical modes traveling along the single mode cores of the original fibers adiabatically evolve into the supermodes of the coupling region. Upon exiting the coupling region, the supermodes will evolve adiabatically back into the original optical modes as the waveguide splits into the two original fibers. Thus, the optical energy passes from the input to the output without being disturbed. A typical fiber asymmetry of $(|\beta_1|-|\beta_2|)/(|\beta_1|+|\beta_2|)=0.005$ and a taper angle of 0.01 radians results in less than 1% in undesired leakage of optical energy from one fiber to the other. To achieve the asymmetry, a pair of identical fibers can be made dissimilar by stretching (adiabatically pretapering) one fiber in a central region. The two fibers are then merged or joined into one waveguide in the coupling region, yet the two fibers behave as if they were optically independent. A grating is next impressed in the coupling region to redirect light at a particular wavelength from one fiber to another. For example, a 125 micron diameter fiber is pretapered by 25%, then elongated and fused to another 125 micron diameter fiber to form a 4.5 micron diameter, 2 cm long waist region with taper lengths of 2 cm. The resulting taper angle is sufficient to produce a low loss, adiabatic taper. For a UV impressed grating period of 0.540 micron, the wavelength of the drop channel of representative devices is in the 1550 nm range.

A suitable starting fiber from which such a coupler may be fabricated is characterized in part by a photosensitive cladding which may be manufactured using known fabrication procedures by doping the cladding region at least partially with a photosensitive species while maintaining the waveguiding properties (i.e., the N.A.) of a standard single mode core fiber. The goal of the deposition processes for use in the present invention is to dope a significant volume fraction of the cladding. The farther the dopant (e.g., Ge) extends out along the radius of the fiber, the more photosensitive the resulting coupler waist will be after the fusion and elongation stages. It is also important that the fiber be doped in a manner that minimizes thermal stress and material property mismatch within the doped cladding.

WDM systems enable multiple wideband signals to be transmitted on a single optical fiber, provided that individual wavelengths can be precisely centered at given values and have narrow bandwidths with high signal-to-noise ratios. These properties must be provided by the add/drop filters, and the concept as disclosed and claimed in the above mentioned applications have special advantages in these respects. However, the technical requirements are so critical, as is described hereafter, that production of units in quantity at low cost without the need for instrumentation, testing and burning-in at each stage, presents formidable challenges.

As described in the previous applications and seen in FIG. 1, the add/drop filter, also referred to as a coupler 10, has a narrow waist 12 formed by elongation from optical fiber precursors. The waist 12, which is in the range of 2–3 cm long, comprises a pair of locally dissimilar, longitudinally merged fibers 14, 15 forming a merged region typically less than 10 microns in cross sectional dimension. Specifically in this example, the waist region 12 is a hybrid dumbbell-ellipsoid in cross-section, here having a major dimension (A) of 10 microns or less and with a minor (B) dimension that provides a 0.82 ratio between the axes. The hybrid dumbbell-ellipsoid (FIG. 2) is a shape having characteristics resembling a cross between a dumbbell shape and an ellipsoid. This shape also has a transverse asymmetry best characterized as a "peanut" or "pear" shape. The asymmetry is the result of the initial pretaper. The smaller fiber 15 in the waist 12 is prestretched before elongation and merging so that it is about 20% smaller (in this example), although the relative size can vary within a range of 10–30% or more. Where the facing sides of the fibers 14, 15 are fused and merged they introduce irregularity into the ellipsoid and retain the asymmetry of the original fibers. The waist region 12 is preferably elongated without twist to prevent the loss of the reference plane defining the centers of the original cores, now only vestigial in character. Maintaining this reference plane in the prepackage before exposure is essential to producing the proper grating tilt asymmetry.

At each end of the waist 12 the fibers extend outwardly in a divergent taper 2–3 cm long along separate tapered coupling branches 20, 21 and 24, 25. This taper is adiabatic and transitions from the small diameter waist region 12 to the much larger single mode optical fibers (not shown) which have diameters of the order of 90–125 microns. These fibers have metallized outer surfaces (not shown) suitable for soldering the coupler to the prepackage and precisely and stably maintaining coupler tension after final packaging. Within the waist region 12, a Bragg grating 27 is recorded that is of selected periodicity suitable for the chosen drop wavelength, and the grating planes are tilted (typically 3°–5°) with respect to the larger of the transverse dimensions of the waist 12. A multi-wavelength input propagating along one branch, e.g., the first tapered coupling branch 21 into the waist region 12 is selectively filtered by the Bragg grating 27, which couples only the drop wavelength into the second tapered coupling branch 20 and the other fiber 30.

In accordance with the invention, the modal relationships, dimensions and properties of the coupler are selected and modified such that a number of advantageous properties are concurrently achieved. Referring now to FIG. 2, the reduced diameter waist sections 14, 15, derived from precursor fibers are doped to be photosensitive (8 mol % germanium is suitable) in the original cladding region surrounding the small higher index of refraction core and have only minute vestigial cores after elongation. Energy is thus confined and propagated in what may be called an air-glass waveguide, the term "air" here meaning the surrounding environment about the physical fiber, whether air or some other medium. Some characteristics of such an air-glass waveguide include a large numerical aperture and multimode waveguiding properties. The radial extent of the field outside the fiber is represented by the dashed line 17.

Within the air-glass waveguiding region of the waist (FIG. 2), the orthogonal optical modes completely occupy and overlap the internal volume of the adjacent fiber 14 or 15, regardless of whether the light originated in fiber 31 or 30. Because of this complete mode overlap, when a grating is impressed within the waist region, the coupling is "non-evanescent", since the modes completely overlap with the grating. Note that the optical mode originally associated with a particular fiber is not localized within that original fiber region in the coupler waist. The modes in the waist are no longer waveguiding in their original fiber material alone.

The air-glass waveguiding property of the coupler waist leads to unique optical characteristics. First, all lossy cladding modes are eliminated. Unlike the precursor optical fiber, whose cladding-air interface also serves as a waveguide, the coupler waist has a new uniform cladding (air) that does not support secondary guiding. The waist supports multiple optical modes, but their number decreases as the diameter decreases. However, a very small waist diameter reduces the number of higher order modes that degrade the short wavelength transmission of this device. These modes are guided in the waist region, yet they escape from the fiber in the adiabatic transition regions of the taper sections and contribute only to background loss at particular wavelengths. In addition, by proper tilt asymmetry of the grating, the coupling strength to these higher order modes can be dramatically reduced or suppressed entirely.

These characteristics become clear upon analyzing the mode diagrams of elliptical cylinders representative of coupler waists, depicted in FIG. 3. Each curve represents one particular mode supported by the waveguide. FIG. 3 [taken from Lewis, J. E. and G. Deshpande, "Modes on elliptical cross-section dielectric tube waveguides", Microwaves, Optics, and Acoustics, Vol. 3, 1979, pp. 147–155] illustrates the normalized propagation constants for modes of a coupler waist with an ellipticity of 0.9 (i.e. greater than the present coupler example of 0.82). The top figure (A) illustrates the odd modes, and the bottom figure (B) illustrates the even modes. The horizontal axis corresponds to the V number of the waveguide, and the vertical axis corresponds to $\beta/\beta_o$ =$n_{ef}$, equivalent to the modal index of refraction of the individual optical modes of the waveguide.

The waveguide characteristics may be expressed in terms of different mode expressions. For example, the $LP_{01}$ (linearly polarized) mode is equivalent to a linear combination of the even and odd $HE_{11}$ modes, and the $LP_{11}$ mode is equivalent to a linear combination of the even and odd $EH_{01}$ and $HE_{21}$ modes. LP mode descriptions assist in the analysis of polarization behavior. The mode evolution properties of elliptical waveguides are more amenable to an LP mode description.

The slope of these characteristic curves is a measure of the effective mode index sensitivity to diameter variations. The greater the sensitivity, the greater the chirping or broadening of the Bragg grating due to a given magnitude of diameter non-uniformity. For smaller diameter couplers (smaller V's) the slope increases and the diameter sensitivity increases. That is, smaller diameter couplers have more challenging diameter uniformity requirements to achieve a narrow spectral bandwidth grating. In addition, the separation between effective index for the $LP_{01}$ and $LP_{11}$ modes increases, corresponding to a larger wavelength separation between the drop and backreflection wavelengths (which can be important, as noted below). The separation between these modes and all the additional higher order modes also increases, ensuring that the lossy peaks associated with coupling to higher order modes are pushed out of the spectral region of interest (e.g., the 1530–1560 erbiun doped fiber amplifier (EDFA) window).

Unlike fiber gratings, there are no lossy cladding modes which contribute to losses in grating assisted mode couplers, because the actual cladding material of the coupler (typically air) does not have a secondary waveguide structure which supports additional optical modes. Only the doped silica coupler waist supports optical propagation.

The grating assisted mode coupler reflects light at a particular wavelength from one fiber back into the same fiber (the backreflection), and reflects light at a different wavelength from one fiber into the other (the add/drop). The add/drop response leads to the desired wavelength routing of light from one fiber to another, while the backreflection response is usually undesirable. Therefore, the wavelength at which the backreflection occurs should lie outside the operating wavelength region of the add/drop filter. For example, for dense WDM applications in the 1530 to 1565 wavelength range, the backreflection wavelength should be either below 1530 nm or above 1565 nm, or lie at a wavelength between the active wavelength channels. The backreflection/drop wavelength splitting should be 18 nm or more.

This wavelength splitting is readily achieved by making the waist of the add/drop coupler sufficiently narrow (<7 microns) such that the wavelength of the backreflection is far from the drop wavelength. By fabricating fused couplers with small waists, the difference between the modal propagation constants of the $LP_{01}$ and $LP_{11}$ modes increases. Therefore, the wavelength splitting of the drop and backreflection also increases. This wavelength splitting is in excess of 15 nm for an elliptical cross section waist with a major axis of approximately 3.5 microns using a specialty doped starting fiber. Further reduction in the coupler waist diameter leads to a further increase in wavelength splitting. The exact relationship between waist diameter and wavelength splitting depends strongly on the physical shape and the exact index of refraction profile of the coupler waist. A general rule would be to make the waist smaller than 5 microns. However, the required uniformity of the coupler waist diameter becomes increasingly stringent as the waist diameter decreases; therefore, the waist diameter is usually selected to be that diameter which gives a backreflection/drop wavelength splitting slightly larger than 15 nm. A given add/drop filter has a backreflection peak on either the short (for pretapered fiber input) or long (for non-pretapered fiber input) wavelength side of the drop peak.

For many telecom applications of add/drops, such as multiplexers/demultiplexers, this drop/backreflection wavelength splitting requirement is substantially relaxed to a splitting on the order of a WDM channel spacing (0.8 nm or 1.6 nm, for example). Therefore, larger splittings are not be necessary if the wavelengths are demultiplexed from the fiber in a sequential manner (shorter wavelengths to longer wavelengths, for example). Even though the longer wavelength devices have short wavelength backreflections, those channels at these wavelengths are already extracted from the fiber by the previous add/drops. Thus for these units, this waist diameter may be larger, reducing the diameter uniformity tolerance of the coupler.

For most telecom applications the polarization properties of the coupler are important. Optical fields are vectorial in nature; that is, they have direction. This direction is quantified by the state of polarization of the optical field. The polarization of an optical signal may be linear, circular, elliptical, or unpolarized. Two linearly polarized optical signals are othogonally polarized if the electric field vectors lie perpendicular to one another. For example, the $LP_{01}$ and $LP_{11}$ modes can be substantially polarized along the x and y directions, where x and y are the major and minor axes of an ellipse.

The grating assisted mode coupler can readily exhibit a polarization dependence of the wavelength of light coupled from the input fiber to the drop. This polarization dependence is due to the form birefringence of the coupler waist in the region of the Bragg grating. In general, the modal propagation constants β within the waists of fused couplers, for light in the two orthogonal polarization states, are not equal. Referring to FIG. 4, it can be seen, by referring to the two dotted line peaks, that a wavelength separation exists between the two orthogonally polarized modes under these conditions. However, for certain cross sectional shapes and index of refraction profiles of the waist, the polarization dependence vanishes (i.e., $|\beta LP_{01,x}|+|\beta LP_{11,x}|=|\beta LP_{01,y}|+|\beta LP_{11,y}|$). Note that the left and right sides of this equation are equal, even though individually $|\beta LP_{01,x}|$ is not equal to $|\beta LP_{01,y}|$ and $|\beta LP_{11,x}|$ is not equal to $|\beta LP_{11,y}|$. In fact, counter-intuitively, the polarization dependence of the drop wavelength of a coupler waist of circular cross section does not vanish, because the polarization degeneracy of the $LP_{11}$ mode does not vanish for a circular waveguide (that is, $|\beta LP_{11,x}|\neq|\beta LP_{11,y}|$ for a circular waveguide), while the polarization dependence of the $LP_{01}$ modes does vanish ($|\beta LP_{01,x}|=|\beta LP_{01,y}|$).

Figure 5:
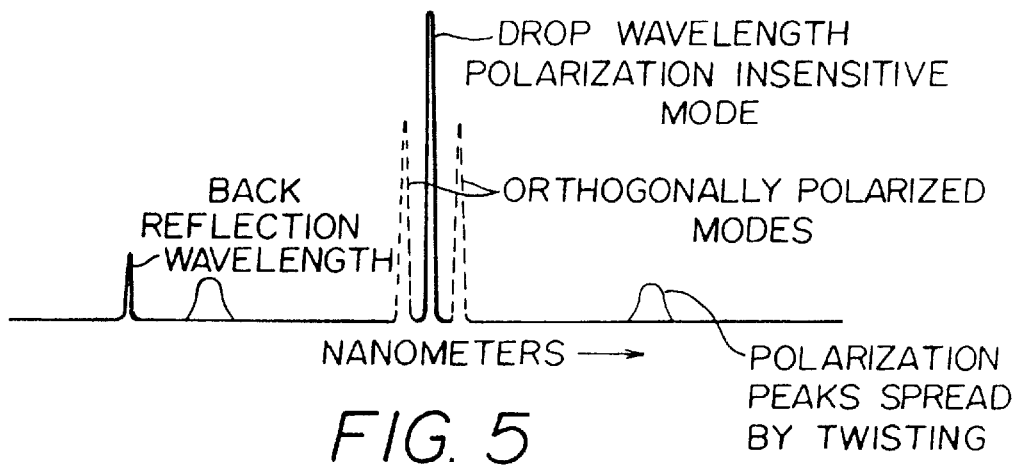
FIG. 5 is a graphical representation of the drop channel spectral characteristics; namely, the drop reflectivity versus wavelength, depicting the effect of twist on the polarization splitting characteristics of the drop channel.

One waist cross sectional shape for which the polarization splitting does vanish at the drop channel is the hybrid dumbbell-ellipsoid with a ratio of minor to major axes of about 0.8. Alternate descriptors include "pear" or "peanut" shaped. Such a waist cross section is achieved when elongating a fused coupler under tension by heating it with a highly controlled and repeatable heat source that is varied in temperature and exposure time to achieve the desired cross section until the monitored polarization characteristics disappear. Examples of suitable heat sources are well known in the art and include $CO_2$ lasers, gas flames and resistive heaters. Alternate waist cross sections have also been designed to eliminate polarization dependence but the hybrid dumbbell-ellipsoid is more readily fabricated. It has been demonstrated that polarization dependence can be reduced to <<0.1 nm by manufacturing the coupler so that its waist has a precise amount of shape asymmetry, as with the preferred elliptical shape. The present add/drop filter has been fabricated in a manner that ensures that the polarization splitting of the add/drop wavelength is less than 0.05 nm. The operation of such a device is then essentially polarization insensitive for gratings of FWHM bandwidth a few times the polarization splitting, or about 0.2 nm. The optical transmission spectra are then independent of the polarization of the input signal. Under such conditions the orthogonally polarized modes merge into the single drop wavelength, as shown in FIG. 5.

Alternatively, if any polarization dependence of the fused coupler remains, it can be dramatically reduced by twisting the fused coupler waist in the region containing the grating, as shown in FIG. 4. As another alternative, for suitable UV grating writing conditions (e.g., polarization and intensity), polarization dependence can be trimmed out by the UV exposure. The UV exposure process produces material birefringence within the glass that can compensate for the form birefringence of the coupler waist.

Figure 6A:
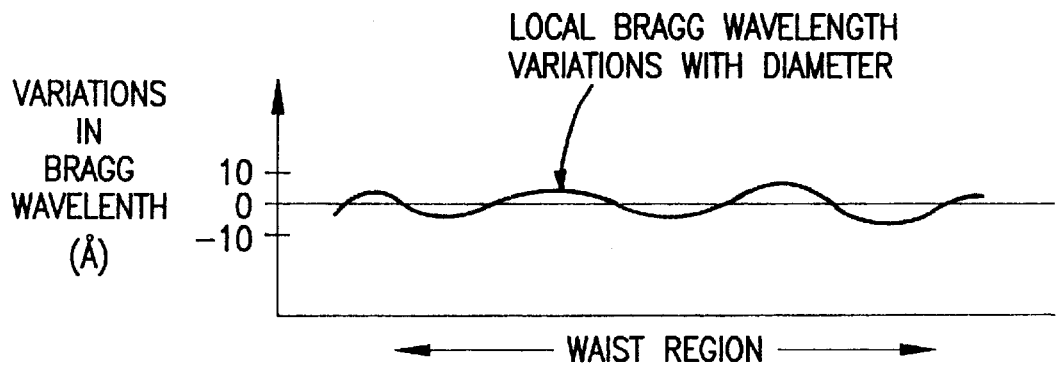
FIG. 6 is an illustrative graph of (A) local Bragg wavelength variations along a typical non-uniform diameter coupler waist before correction and (B) local Bragg wavelength after correction.
Figure 6B:
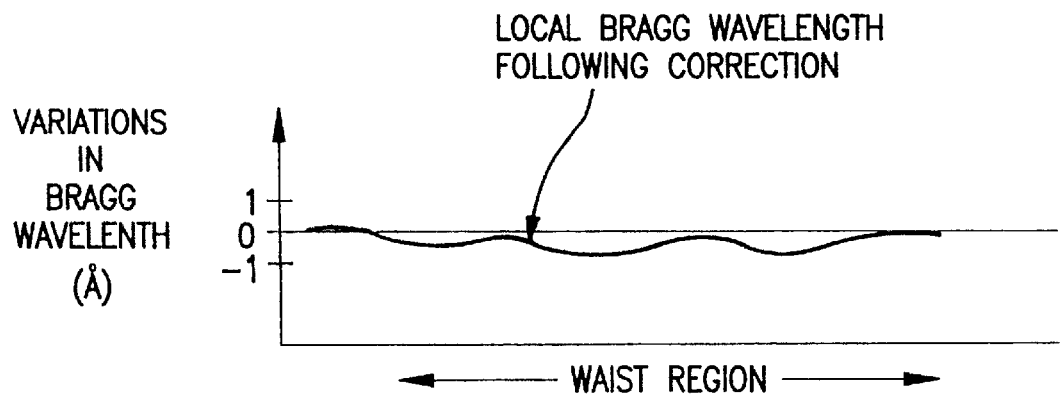

The response of a reflection grating in a coupler waist is often undesirably "chirped" or spectrally distorted if the diameter of the waist is non-uniform, because the local propagation constants and drop wavelengths vary with changing diameter. Therefore, a grating of constant period within a non-uniform waist will have a broader spectral width than a grating of constant period within a uniform waist. A grating with a 1 Angstrom spectral width requires that the variation in diameter be less than 0.01 microns for a 5 micron cross sectional coupler waist over that region of the waist containing the grating. Similarly, the shape of the coupler should be constant over this region containing the grating to prevent additional chirp and polarization dependence. A highly uniform heat source such as a reciprocating $CO_2$ laser or flame can be applied to give highly uniform coupler waists. Alternately, grating chirp due to small variations in the diameter of the coupler waist on the grating response can be substantially reduced or effectively eliminated, in accordance with the invention, by local $CO_2$ laser heating to correct diameter variations, by locally varying the grating period impressed in the coupler waist to maintain a constant Bragg wavelength, or by laser trimming of the background d.c. index of refraction along the grating. These techniques effectively reduce spatial variations in the local Bragg wavelength of the grating along the coupler waist, as illustrated in FIG. 6. This confronts one of the key issues in the manufacture of narrow bandwidth add/drop devices, such as those required for 100 and 50 GHz WDM systems based on grating assisted mode couplers. To determine the non-uniformities of diameter in a manner that can be scaled up to a manufacturable process, they can be directly measured by scanning electron microscopy, atomic force microscopy, by reconstructing the index profile from the complex reflectivity profile, by measuring the local amount of UV induced fluorescence, by examining the position and wavelength dependence of reflectivity, or by analyzing the spectral and spatial characteristics of light scattered transversely off the coupler waist.

In addition to producing uniform gratings within fused couplers, precisely apodized gratings are necessary to reduce grating sidelobes and eliminate adjacent channel crosstalk. Apodized gratings are key to meeting the performance requirements of WDM systems. Apodization is understood to have been achieved by several methods, including variable speed scanning, dithering of the phase mask and apodized phase masks.

An apodized grating can be written by spatially varying the modulation amplitude or a.c. component of the index of refraction in the longitudinal direction along the grating. At the same time, however, the d.c. or background index of refraction must remain extremely uniform (variations less than 0.0001) to prevent undesirable chirp or broadening of the grating. Raised cosine ($\cos^2(z)$), $\text{sinc}^2(z)$, and Gaussian ($\exp\text{-}z^2/2\sigma^2$) apodization functions are all effective in reducing the grating sidelobes to below −30 dB.

Figure 7:
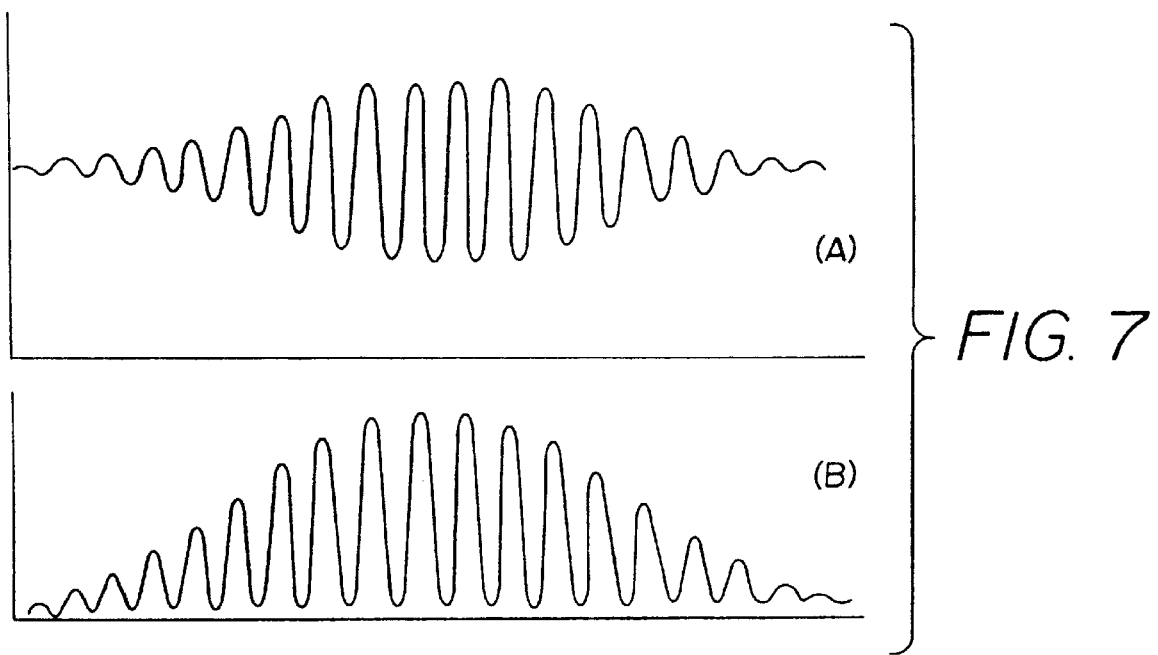
FIG. 7 is an illustrative graph (not to scale) of UV induced index of refraction variations in a coupler corresponding to an apodized grating, such as a cosine-squared or Gaussian apodization function.
Figure 8:
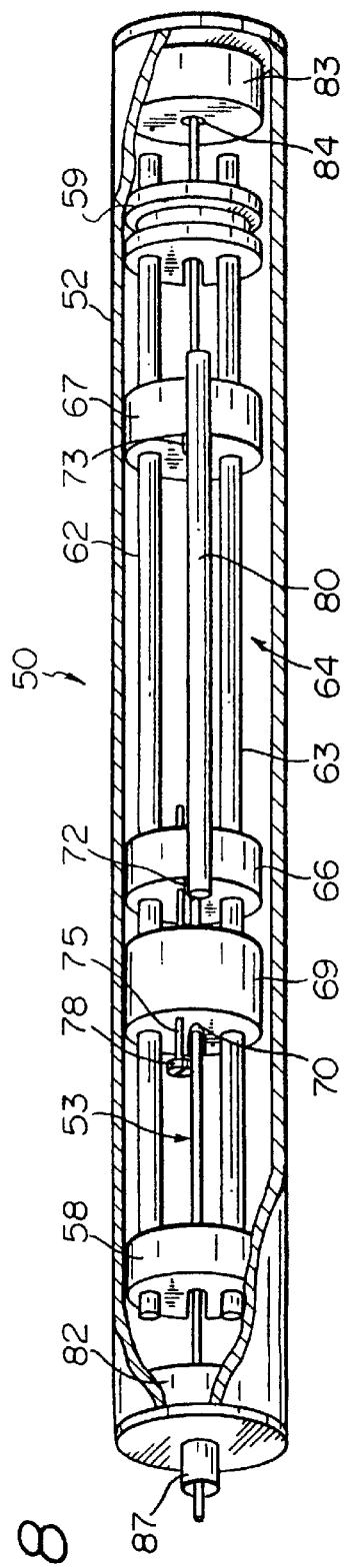
FIG. 8 is a break-away perspective view of an exemplary coupler in accordance with the invention having a cylindrical housing and an interior optical fiber support structure or prepackage.
Figure 9:
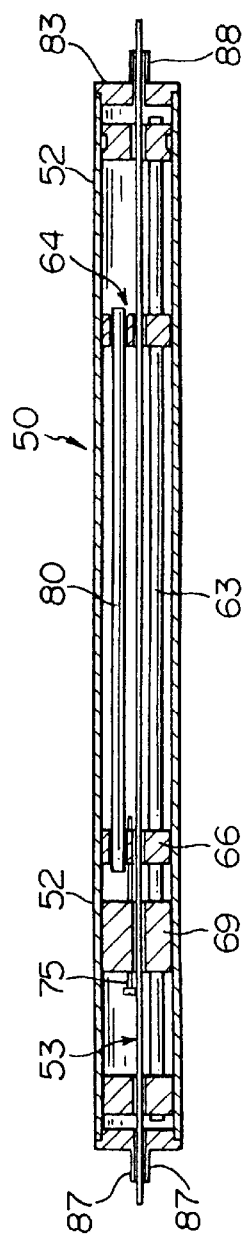
FIG. 9 is a side sectional view of the coupler of FIG. 8.
Figure 10:
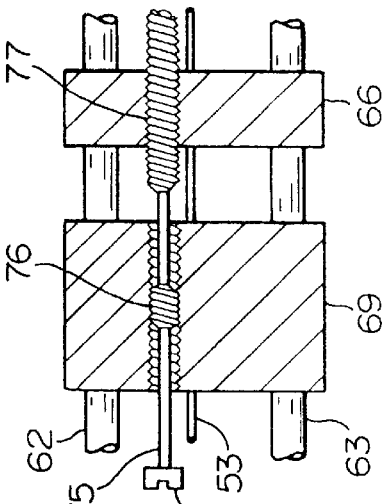
FIG. 10 is a fragmentary side sectional view of a fine tuning mechanism for compensation of wavelength within the coupler of FIG. 8 and 9.
Figure 11:
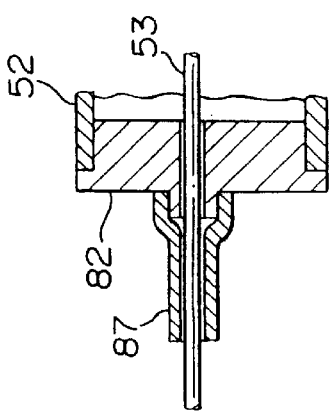
FIG. 11 is a fragmentary side sectional view of an end portion of the coupler, showing the manner in which the coupler housing is hermetically sealed and the exterior fibers are protected.

An apodized grating exhibits a longitudinally varying index of refraction modulation amplitude as well as a uniform period pattern along the waveguide. That is, the grating is gradually (over a large number of grating periods >1000) turned on and then off along the light propagation direction. This smoothly varying window function reduces the spectral ringing or sidebands resulting from gratings with a sharp, rectangle window function. In general, the frequency spectrum of the filter is the Fourier transform of the spatial window function of the filter. A superior method to achieve apodization is to use a scanning exposure, in which the contrast of the optical interference pattern is varied as the grating is recorded while the total incident intensity is contrast. To achieve this, the waist region is simultaneously exposed with a d.c. beam counter-propagating with the modulated a.c. beam while the interference pattern is imprinted. The sum of the intensities of the interference pattern and the uniform beam are kept constant, eliminating undesirable chirp arising from variations in the background index of refraction. As seen in FIG. 7, the index of refraction function for the $\cos^2$ apodized grating is thus an apodized periodic wave varying in bipolar fashion about a center line over a grating length L and is given by:

$$\Delta n(z) = \Delta n_o(z)\left[1 + \sin k_g z \cos^2 \frac{\pi z}{L}\right]$$

The intensity of the a.c. beam is:

$$I(x) = I_o(\sin k_g z + 1)\cos^2 \pi z_i | L$$

and the intensity of the d.c. beam is:

$$I(z) = I_o \sin^2 \pi z/L.$$

Important advantages of the invention also reside in the features included in the example of FIGS. 7–10, to which reference is now made. The add/drop coupler device 50 comprises a cylindrical housing 52 of stainless steel tubing that has a 0.270" OD and a length of 3.67" and what may be termed a "prepackage" or support structure 54 internal to the housing 52. The prepackage structure 54 is inside the housing 52 after assembly but used as a preliminary retainer to hold in the optical fiber coupler 53 precisely during processing steps in which the grating is written and adjustments are made. The prepackage structure 54 extends longitudinally along and within the housing 52, and centrally supports and retains the optical fiber coupler 53, in position along the approximate central axis.

In an initial assembly the opposite ends of the optical fiber coupler 50 are fixed to spaced apart brass end hubs 58, 59 on a pair of parallel invar rods 62,63 that extend along the majority of the inside length of the housing 52. For solderability and freedom from contamination, the hubs 58, 59 and rods 62, 63 are nickel plated, preferably by an electroless process, as are the other elements within the housing 52.

The prepackage structure is completed by interposition between the end hubs 58, 59 of a pair of spaced apart base hubs 66, 67, one of which is proximate to the end hub 59 and is soldered or welded to the first invar rod 62. The other base hub 66, on the second rod 63, is adjacent a reference hub 69 on the first end hub 58 side, also on the second rod 63.

In the prepackage assembly and adjustment phase, there are two subassemblies of rods and hubs, longitudinally slideable relative to each other. One subassembly comprises the first invar rod 62, the first end hub 58 and the second base hub 67, each hub being fixed in position on the rod 62. The other assembly comprises the second invar rod 63, the reference hub 69, the first base hub 66 and the second end hub 59. Engaged in this way, the whole assembly may be mounted in a fitted jig or tray (not shown) with the waist region of the optical coupler 53 being open, for writing of a Bragg grating, to an optical system mounted on the side.

The optical fibers in the coupler 53 diverge from the waist region at each end to where they are fusion spliced to metallized optical fibers of standard dimension. The entire optical coupler 53 extends along the approximate central axis of the housing 52, passing through radial slots 70 provided in each of the hubs 58, 59, 66, 67 and 69. When the prepackage structure 54 is held rigidly in place in its positioning tray, the coupler 53 can then be soldered at its end regions to the central regions of the spaced apart end hubs 58, 59. The waist region is thus stably configured for photosensitization and grating writing steps.

When a grating is written in the waist region with a selected periodicity its drop wavelength must be adjusted to sub-nanometer precision and this wavelength should be essentially constant over the required operating temperature range, normally −35° C. to 85° C. Although invar has a very low temperature coefficient, it alone cannot meet the athermal. The prepackage requirements are that the separation between the end hubs 58, 59 decreases as temperature is increased. This decreases the tension and resulting strain $\epsilon$ within the coupler waist with increasing temperature T in a manner that satisfies the following equation:

$$\frac{\partial \varepsilon}{\partial T} = -\frac{\Lambda_g}{n_{\textit{eff}}}\frac{\partial n_{\textit{eff}}}{\partial T} - \frac{\partial \Lambda_g}{\partial T}$$

For Ge-doped silica glasses, the primary contribution to the temperature dependence arises from the first term on the right of the above equation; that is, the temperature dependence of the effective index of refraction $n_{\textit{eff}}$. The second term on the right, the thermal expansion contribution to the change in grating period, is typically an order of magnitude smaller than the first term.

Note that the base hubs 66, 67 include aligned longitudinal grooves 72, 73 respectively, in their peripheries, and that an adjustment screw 75 extends through the reference hub 69 and the first base hub 66. Consequently, after first adjusting the end hubs 58, 59 to tune the grating, the wavelength is locked in by soldering a stainless steel rod to grooves 72, 73 in the base hubs 66, 67. This inner structure within the prepackage establishes an interior length which has a different thermal coefficient of expansion than the invar rods 62, 63 which are seated at each end but not otherwise spatially defined except through the interior stainless steel connection. Each base hub 66, 67 is coupled to a different invar rod 62 or 63 respectively but has a different spacing along that rod from the end hub 58 or 59 which determines the grating periodicity.

With the stainless steel rod 80 in place, the unit can be inserted into a temperature controlled chamber and cycled through the required temperature range while reading the drop wavelength with optical spectrum analyzer instrumentation. To adjust the drop wavelength so that it is the same at 25° C. as 85° C., the adjustment screw 75 is threaded inwardly or outwardly relative to the reference hub 69. As best seen in the fragmentary view of FIG. 14, the screw has a first short thread 76 mating in the reference hub 69, and a terminal second thread 77 mating in the first base hub 66. By turning the screw 75 at the screw head 78, the screw engagement point with reference hub 69 can be shifted longitudinally, increasing or decreasing the length of one invar segment and increasing or decreasing the length of the stainless steel segment.

When the prepackage structure 54 including the optical coupler 53 is adjusted, it is removed from the holder or tray and inserted into the cylindrical housing 52. The prepackage 54 is fixed in position relative to the housing 52 simply by crimping the housing 52 (see FIG. 7), onto the second end hub 59. End caps 82, 83 with central bores 83 providing openings for the fibers are engaged into the housing 52 open ends, and soldered or welded into place. The outwardly extending fibers at the exit points are soldered to the end cages 82, 83 to produce hermetic seals. Preferably, for longer life, the housing 52 is filled with an inert gas before the housing 52 is sealed. The outwardly extending fibers are protected against kinking and strain by shrink fit tubes 87, 88 of a suitable length.

To reduce the propagation of cracks within the coupler waist and failure of the coupler after packaging, the coupler should be hermetically packaged. The presence of water within the package can lead to coupler failure. This problem is exacerbated when the coupler is packaged under tension, which is necessary to provide a temperature insensitive mount, for example. Preferably, the coupler is packaged either in argon, helium, nitrogen gas or a mixture thereof, or in vacuum.

A device similarly packaged can be rendered tunable by the addition of a active tuning mechanism. We have disclosed in U.S. Ser. No. 08/703,357 the design of a low loss, all-fiber optical switch using two add/drop filters whose add and drop ports are joined to one another. If the drop wavelength of the two filters coincide, light from a first fiber will be routed to a second fiber. If the drop wavelength of one of the filters is de-tuned so that the two drop peaks no longer coincide, then the light will return the first fiber. Thus, a light signal can be switched from one fiber to another. One mechanism to instantaneously de-tune an add/drop filter is to launch a high intensity switching beam down the coupler waist. If the beam is of sufficiently high intensity, the index of refraction of the waist can change almost instantaneously (on the order of fsec) through the Kerr effect. By modulated the switching beam, light can be rapidly switched from one fiber to another. This technique does not required precise control of the intensity of the switching beam. It only requires that the intensity be sufficient to de-tune the two filters. Since silica glass used in the manufacture of optical fibers does not display large optical nonlinearities, relatively high optical intensities are required. However, other optical materials, such as specially doped silica, electrically poled silica, crystalline or polymer materials are promising candidates for this application. Another mechanism to switch an add/drop filter is to surround the coupler waist by a gas, liquid, or other substance whose optical properties can be changed by the application of an electrical, magnetic, or optical control signal. One example is a liquid crystal, whose index of refraction varies upon application of an electric field.

Although there have been described above various forms and modifications it will be appreciated that the invention encompasses all variations and expedients within the scope of the appended claims.

We claim:

1. A multi-mode light propagation element comprising a light confining region defined by inherently optically independent merged optical fibers configured to propagate different light modes independently except at a particular wavelength for which at least one forward propagating optical mode is capable of being coupled to at least one backward propagating optical mode.

2. An element as set forth in claim 1 above, wherein the optical fibers are of dissimilar cross-section in the region longitudinally adjacent to and on both sides of the merged region.

3. An element as set forth in claim 1 above, wherein the optical fibers are merged along a length and the forward and backward propagating light modes are orthogonal.

4. An element as set forth in claim 3 above, wherein the shape of the merged region is modified such that mode birefringences of each of the $LP_{01}$ and $LP_{11}$ modes are equal and opposite and the drop wavelength is polarization insensitive.

5. An element as set forth in claim 3 above, wherein the element is twisted angularly about its propagation direction to an extent by which the difference in propagation constant for orthogonal polarization components of the optical modes is substantially diminished and the particular wavelength of element is substantially independent of polarization.

6. An element as set forth in claim 1 above, wherein the merged region has diameter and index of refraction such that energy is propagated along the environment surrounding the fiber body as well as by the fiber body.

7. An element as set forth in claim 6 above, wherein the fibers are stretched core-cladding optical fibers in which the original core is vestigial and the original cladding comprises the substantial majority of the fiber.

8. An element as set forth in claim 7 above, wherein the fiber diameter is less than about 10 microns and selected to minimize the number of higher order modes which contribute to loss within the wavelength operating range of interest.

9. An element as set forth in claim 8, above, wherein the merged fiber region is of generally dumbbell-ellipsoidal cross-section with a minor to major axis ratio of approximately 0.8.

10. An element as set forth in claim 7 above, wherein the original cladding of at least one of the fibers includes a diffraction grating.

11. An element as set forth in claim 10 above, wherein the element includes tapered optical coupling branches transitioning adiabatically from the merged region to the optical fibers and a diffraction grating reflecting propagating energy at a selected wavelength between optical fibers.

12. An element as set forth in claim 11 above, wherein the element includes a waist region in which the fibers are fused together longitudinally and the grating planes are tilted at an acute angle relative to a perpendicular to the direction of propagation.

13. An element as set forth in claim 10 above, wherein, in the waist region, variations in propagation constant along the length are corrected by an incident laser beam.

14. An element as set forth in claim 10 above, wherein in the waist region, variations in propagation constant along the length are compensated by adjusting the local grating period to produce a substantially uniform local Bragg wavelength along the waist region.

15. An element as set forth in claim 10 above, wherein the diffraction grating is apodized along its length.

16. An element as set forth in claim 15 above, wherein the apodization function comprises variations in the index of refraction about a media line and includes both a.c. and d.c. components.

17. An element according to claim 15 in which the envelope function of the a.c. component substantially varies according to a $\Delta n \cos^2(\pi/L\ z)\ (\sin k_g z + 1)$ and the d.c. component substantially varies according to $-\Delta n \cos^2(\pi/L\ z)$, where L is the length of the grating and z=0 is the longitudinal center of the grating.

18. An element as set forth in claim 17 above, wherein the adjacent fibers are fused together along the length including the diffraction grating and the diffraction grating is within the original cladding of both fibers.

19. An element as set forth in claim 10 above, wherein the diffraction grating reflects both a drop wavelength and a backreflection wavelength and wherein the element includes means for increasing the separation between the drop and reflected wavelengths.

20. An element as set forth in claim 19 above, wherein the fibers in the region of the diffraction grating are of cross-sectional dimension sufficiently small so that the backreflection wavelength is shifted outside the operating wavelength range of the element.

21. An element as set forth in claim 10 above, including in addition a support body comprising at least one rigid unit coupled to engage opposite longitudinal ends of the light propagating element of a selected spacing, the rigid unit including a temperature compensating device for adjusting the spacing between the ends of the element throughout a chosen temperature range.

22. An element as set forth in claim 21 above, wherein the support body is configured to provide optical access to the grating region of the fibers.

23. An element as set forth in claim 21 above, including in addition a housing means encompassing the support body and the optical fibers and including hermetic seals isolating the housing interior from the environment, and wherein the housing interior confines a protective gas.

24. A multi-mode light propagation element comprising a light confining region including at least two different outputs, the light confining region including shape geometry and periodic index of refraction variations for differently propagating different light modes to different outputs from the element.

25. An optical fiber coupler in accordance with claim 24 comprising:
   (a) a length of first optical fiber;
   (b) a length of second optical fiber including a core and a photosensitive cladding;
   (c) said lengths of first and second optical fibers being tapered to a central region having a length of reduced cross-sectional area, the fibers being longitudinally fused along the length of reduced area to form said multi-mode light propagation element.

26. An optical fiber coupler in accordance with claim 25 wherein said first and second optical fibers are inherently optically independent.

27. An optical fiber coupler in accordance with claim 25 wherein said multi-mode light propagation element includes a diffraction grating in a central region.

28. An optical fiber coupler in accordance with claim 26 wherein the diffraction grating is asymmetric and the period and asymmetry of said diffraction grating is chosen to couple a forward propagating mode of said first optical fiber to a backward propagating mode of said second optical fiber.

29. An optical fiber coupler in accordance with claim 26 wherein said grating is transversely asymmetric.

30. An optical fiber coupler in accordance with claim 25 wherein said first and second optical fibers are dissimilar in cross sectional dimension upon entering the length of reduced cross sectional area.

31. An optical fiber coupler in accordance with claim 25 wherein at least one of said optical fibers is single mode at a predetermined wavelength.

32. An optical fiber coupler in accordance with claim 25 wherein said second optical fiber has a cladding containing at least 0.5 mol % Germanium.

33. An optical fiber coupler in accordance with claim 25 wherein the doping of the modified cladding portion in the length of reduced area is selected such that the background index of refraction is substantially uniform throughout the cladding in the length of reduced area and the original core is vestigial.

34. An optical fiber coupler in accordance with claim 25 wherein said optical fibers are of dissimilar index of refraction entering the central region.

35. A optical waveguide coupler in accordance with claim 24 and further comprising:
   (a) a first and second optical waveguide, said first and second waveguides being merged along a predetermined length to form a multi-mode light propagation element in which no substantial wavelength insensitive coupling of light from said first waveguide to said second waveguide occurs;
   (b) a diffraction grating in said multi-mode light propagation element.

36. A waveguide coupler in accordance with claim 24 comprising:
   (a) a multiplicity of waveguides greater than or equal to two longitudinally merged in a central interaction region to form a multi-mode light propagation element;
   (b) said waveguides being substantially optically independent over a substantial wavelength range;
   (c) said multi-mode light propagation element including a light diffracting element within said light confining region.

37. A waveguide coupler in accordance with claim 36 wherein sa id light diffracting element includes one or more diffraction gratings which couple light between the multiplicity of waveguides at one or more particular wavelengths.

38. A waveguide coupler in accordance with claim 36 wherein said waveguides are single mode optical fibers, and the first and second waveguides are of dissimilar cross sectional dimensions upon entering the merged coupling region.

39. A waveguide coupler in accordance with claim 36 wherein said first and second waveguides are of dissimilar index of refraction upon entering the merged coupling region, and wherein said diffraction grating is transversely asymmetric.

40. A polarization insensitive grating assisted mode coupler having a single period grating and comprising dielectric waveguide means for propagating input optical wave energy to an output unaffected by the polarization of the input wave energy.

41. A grating assisted mode coupler having a merged region whose waveguide structure in the merged region is configured such that the drop channel wavelength for a first polarized signal is less than 0.05 nm from the drop channel wavelength of a second polarized signal whereby the first and second polarized signals have orthogonal polarization.

42. A coupler as in claim 41 above, wherein the merged region defines a coupler waist and wherein modal propagation constants $\beta$ for the $LP_{01}$ and $LP_{11}$ optical modes polarized along the x and y directions within the coupler waist satisfy the relation:

$$|\beta LP_{01,x}|+|\beta LP_{11,x}|=|\beta LP_{01,y}|+|\beta LP_{11,y}|.$$

43. A coupler as in claim 41 above, wherein the merged region defines a coupler waist and wherein the birefringence of the $LP_{01}$ mode is equal and opposite in sign to the birefringence of the $LP_{11}$ mode to satisfy the relation:

$$|\beta LP_{01,x}|-|\beta LP_{01,y}|=-(|\beta LP_{11,x}|\beta LP_{11,y}|).$$

44. A grating assisted mode coupler receiving an input light signal that is not polarization specific, wherein the coupler includes means for directing light from the grating, the light having optical loss and optical transmission spectra that are independent of the polarization of the input signal.

45. A mode coupler as set forth in claim 44 above, wherein the coupler includes a merged region containing a diffraction grating, and wherein the geometry of the merged region is adapted to provide the independence of polarization.

46. A mode coupler as set forth in claim 45 above, wherein the geometry of the merged region is defined by its cross-sectional shape.

47. A mode coupler as set forth in claim 45 above, wherein the merged region has a substantially dumbbell-ellipsoidal shape.

48. A mode coupler as set forth in claim 47 above, wherein minor axis of the dumbbell-ellipsoidal shape has a ratio of about 0.8 to the major axis.

49. A mode coupler as set forth in claim 45 above, wherein the merged region is angularly distributed about the direction of propagation to provide equal and opposite birefringence in selected modes.

50. An optical fiber device with no coupling to short wavelength, lossy cladding modes outside a selected wavelength, band comprising a fiber having photosensitive cladding, the fiber tapering adiabatically to and from a central narrow waist region having the properties of a high numerical aperture waveguide having a substantially limited number of lossy guided modes.

51. An optical fiber device in accordance with claim 50, wherein the device comprises a pair of fibers having a fused central waist region including a Bragg grating defining a wavelength of interest in a selected wavelength band and wherein the lossy guided modes are removed from the selected wavelength band.

52. An optical fiber device in accordance with claim 5 1, wherein the fibers in the central waist region are of the less than 5 microns in diameter.

53. A grating assisted coupler for optical transmission comprising:
   a pair of optical fibers having a longitudinal merged region and forming a non-evanescent structure, the merged region including at least one diffraction grating and having cross-sectional dimensions whose variance affects the spectral bandwidth of the coupler; and
   laser induced variations in the merged region to correct for variations in the cross-sectional dimensions.

54. A coupler as set forth in claim 53 above, wherein the fibers are substantially photosensitive.

55. A coupler as set forth in claim 53 above, wherein the merged region is of the order of 5 microns in cross-sectional dimension.

56. An optical waveguide coupler including a reflection grating in a narrow waist waveguide region, an arrangement for providing substantially uniform local modal propagation constants in the grating region comprising:
   a narrow waist waveguide region being subject to dimensional non-uniformity in diameter; and
   interior variations in the reflection grating selected to compensate for the dimensional variations.

57. A coupler as set forth in claim 56 above, wherein interior variations result in less than 1 angstrom of spectral broadening of reflection grating.

58. An optical device comprising a wave propagation device including a grating providing a backreflection at a first wavelength and a drop reflection wavelength at a different wavelength,
   and having geometry and index of refraction characteristics in the grating region selected to provide a difference in the modal propagation constants of the modes to establish a selected separation between the backreflection wavelength and the drop reflection wavelength.

59. An optical device as set forth in claim 58 above, wherein the grating region of the device has a diameter of less than about 10 microns.

60. An optical device as set forth in claim 59 above, wherein the grating region has an ellipsoidal cross-section with a major axis of about 4.5 microns.

61. An optical waveguide coupler comprising:
   an elongated hollow housing;
   an optical waveguide coupler element extending along and within the housing, the coupler element including a central, narrow waist extending along the housing, and two pairs of terminal optical fibers extending out of the opposite end of the housing;
   a support element for the coupler element having at least one region of engagement to the housing, the support element being attached to the coupler element at opposite ends of the coupler element and including elements supporting the coupler waist which vary in length and vary the coupler waist tension over a preselected temperature range and spatially separated to allow optical access to the waist region; and
   a hermetic seal means for closing the ends of the cylinders.

62. A coupler as set forth in claim 61 above, wherein the support element comprises a prepackage having a pair of substantially temperature invariant rods extending along the cylinder axis and a pair of spaced apart end hub elements positioned along the rods with a predetermined spacing;
   and wherein the prepackage further comprises a third rod of different thermal coefficient of expansion than the pair of rods and differentially coupled to the pair of rods to compensate for variations in temperature.

63. A coupler as set forth in claim 62 above, wherein the prepackage includes a pair of interior hub elements each engaging a different region of the third rod mechanism to a different one of the pair of rods at a selected spacing, and one of the interior hub elements for adjusting the temperature range in which compensation is afforded.

64. A coupler as set forth in claim 63 above, wherein the coupler comprises metalized layers on the coupler element soldered to the end hubs at the opposite ends of the waist region, and wherein the interior of the housing confines a protective atmosphere.

65. A coupler as set forth in claim 64 above, wherein the waist region of the coupler element has a diameter of less than 10 microns, the housing is a cylinder having a diameter of less than about 5 mm and wherein the coupler includes means adjacent to the ends of the housing for limiting bending of the extending ends of the fibers.

66. A coupler as set forth in claim 65 above, wherein the coupler element includes a diffraction grating in the narrow waist and the end hubs support the coupler element under tension.

67. A coupler as set forth in claim 66 above, wherein the tension is adequate to maintain the elongation of the coupler waist from 0.1 to 0.5%.

68. A coupler as set forth in claim 66 above, wherein the pair of rods are of invar, and the third rod is of stainless steel, and wherein the adjustable mechanism comprises a fifth hub movable along the invar rods adjacent to one of the interior hubs and a screw element threaded through the fifth hub and the adjacent interior hub.

69. A coupler as set forth in claim 68 above, wherein the waist region is in the range of about 2–3 cm long, and each pair of terminal optical fibers is in the range of about 2–3 cm long, and wherein the waist region comprises fused fibers of hybrid dumbbell-elliptical cross-section of the order of 3–6 microns in cross-sectional dimension, one fiber being appropriately 15–25% smaller than the other.

70. A coupler as set forth in claim 69 above, wherein the hubs have circular perimeters sitting within the cylinder, the invar rods extending through the hubs lie in a common plane, the two interior hubs have longitudinal peripheral grooves in alignment, and the stainless steel rod mates in and is secured into the peripheral grooves.

71. A fiber optical wave filter including a Bragg grating for providing a selected add/drop wavelength output in response to an input signal within a wavelength band of interest comprising:

an optical fiber coupler having a merged waist region of two fibers and including a Bragg grating which extends along a longitudinal axis for the fiber coupler, the fiber coupler including a pair of diverging arms extending from each end of the waist region substantially along the longitudinal axis;

a coupler carrier element supporting and fixedly joined to the diverging arms at the spaced apart ends to establish tension on the waist region; the coupler carrier element including a mechanism for stabilizing the tension on the waist region through a selected temperature range to equalize the periodicity of the Bragg grating; and a housing hermetically sealed about the coupler carrier element and the optical fiber coupler.

72. A filter as in claim 71 above, wherein the filter operates in a wavelength band of interest from 1530 nm to 1565 nm and in a temperature range from 25° C. to 85° C., and wherein the carrier element includes elongated elements having at least two different thermal coefficients of expansion disposed to compensate for thermal variation of the optical fiber coupler by adjusting the tension thereon, including an adjustment device for setting the temperature range to be compensated.

73. A waist region device for an optical waveguide coupler having two longitudinally fused fibers, characterized by central waist region less than 10 microns in cross-sectional dimension, comprising a photosensitive body longitudinally having only vestigial cores, the photosensitive body including a wavelength selective Bragg grating, wherein the photosensitive body has a cross-sectional geometry such that the coupler is insensitive to the polarization of light propagated therein.

74. A waist region device as set forth in claim 73 above, wherein the central waist region has an elliptical cross-section with minor to major axis ratios of about 0.8 and the grating is tilted at an angle of about 3° to 5° relative to the longitudinal direction.

75. A waist region device as set forth in claim 74 above, wherein the waist region is compensated for dimensional variations in the cross-section to reduce the spectral band of wavelengths selected by the Bragg grating.

76. A waist region device as set forth in claim 75 above, wherein the cross-sectional dimensions of the fibers are sufficiently small they are unsupportive of lossy cladding modes and spread the wavelength separation between the wavelength selected by the Bragg grating and the wavelength of back reflections from the grating.

* * * * *